United States Patent [19]
Sakai et al.

[11] Patent Number: 5,518,459
[45] Date of Patent: *May 21, 1996

[54] AUTOTENSIONER

[75] Inventors: Kouichi Sakai, Zama; Hayato Oumi, Chigasaki; Hiroshi Suzuki, Yokohama, all of Japan

[73] Assignee: NSK, Ltd., Tokyo, Japan

[ * ] Notice: The term of this patent shall not extend beyond the expiration date of Pat. No. 5,352,160.

[21] Appl. No.: 284,985

[22] Filed: Aug. 4, 1994

[30] Foreign Application Priority Data

Aug. 4, 1993 [JP] Japan ................. 5-046416 U

[51] Int. Cl.⁶ ................................................. F16H 7/08
[52] U.S. Cl. .......................................................... 474/133
[58] Field of Search ........................ 474/101, 109–111, 474/113–117, 133–138

[56] References Cited

U.S. PATENT DOCUMENTS

| | | |
|---|---|---|
| 4,077,272 | 3/1978 | Busso .................. 474/135 X |
| 4,277,240 | 7/1981 | Kraft . |
| 4,464,147 | 8/1984 | Foster . |
| 4,981,116 | 1/1991 | Trinquard . |
| 5,078,657 | 1/1992 | Speil et al. . |
| 5,141,475 | 8/1992 | Sajczvk et al. .......... 474/135 |
| 5,171,188 | 12/1992 | Lardrot et al. . |
| 5,236,396 | 3/1993 | Golovatai-Schmidt et al. . |
| 5,288,276 | 2/1994 | Golovatai-Schmidt et al. . |
| 5,352,160 | 10/1994 | Sakai et al. .......... 474/135 X |

FOREIGN PATENT DOCUMENTS

| | | |
|---|---|---|
| 1-131058 | 9/1989 | Japan . |
| 2222225 | 2/1990 | United Kingdom . |
| WO92/21894 | 12/1992 | WIPO . |

*Primary Examiner*—Michael Powell Buiz
*Attorney, Agent, or Firm*—Evenson, McKeown, Edwards & Lenahan

[57] ABSTRACT

An autotensioner for use in applying a tension to a moving belt, comprises a bracket secured to an engine body and having a projection, a rocking member rockingly mounted to the bracket through a first axle and having an arm, a pulley rotatably mounted to the rocking member through a second axle for applying the tension to the moving belt, and a damper device provided between the projection of the bracket and the arm of the rocking member.

2 Claims, 10 Drawing Sheets

AUTOTENSIONER

BACKGROUND OF THE INVENTION

1. Field of the Invention

The present invention relates to an autotensioner, and, in particular, to an autotensioner for applying proper tension to a timing belt for use in an automobile engine or to a belt for driving auxiliary equipment such as an alternator or a compressor or the like (hereinafter referred to simply as a "belt"), while controlling vibration in the belt.

2. Description of the Prior Art

Figure 1:
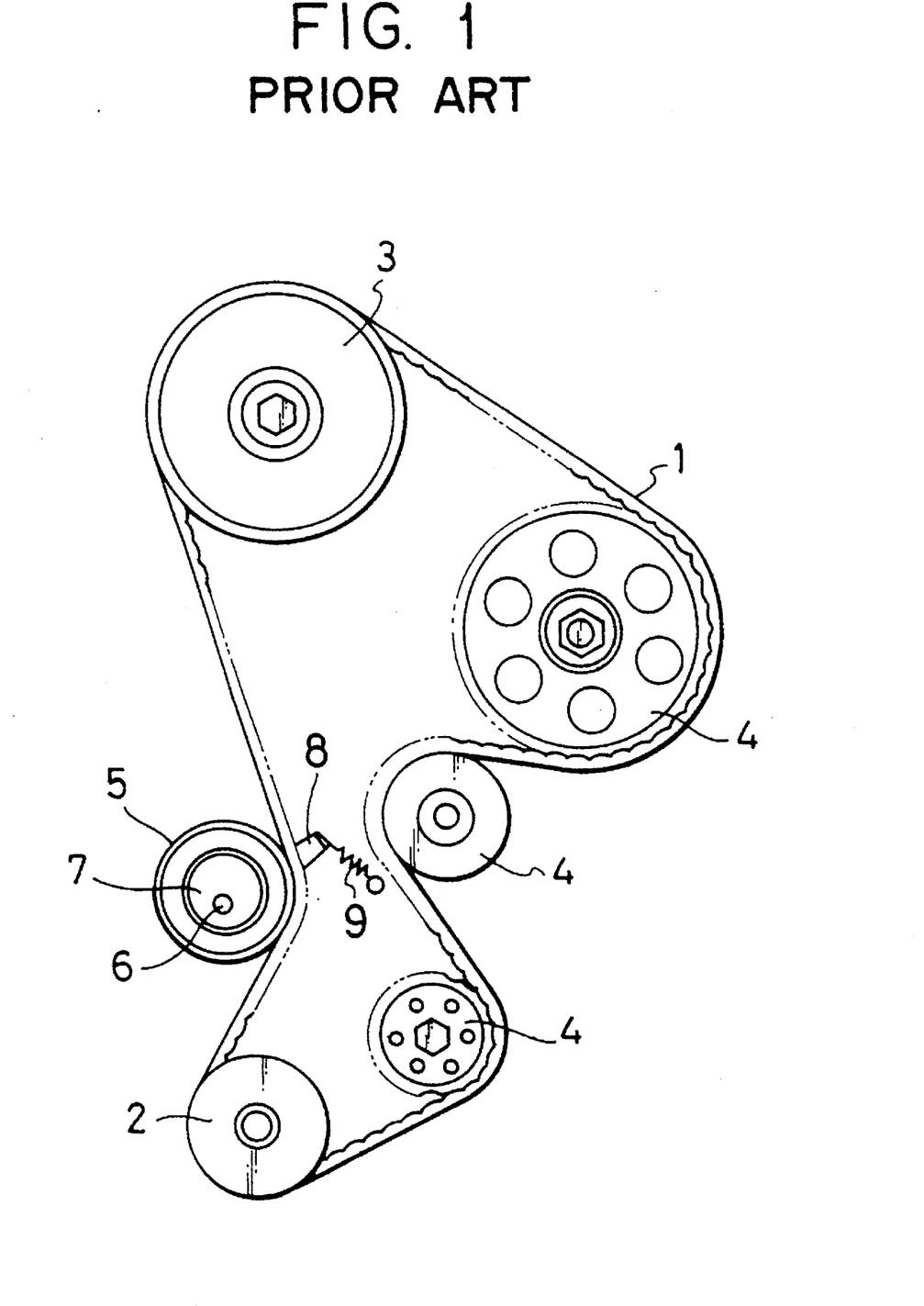
FIG. 1 is a front elevational view of one example of the operational state of a conventionally known autotensioner.

A drive device using a belt 1 as illustrated in FIG. 1 is widely used to rotatably drive a cam shaft for an OHC type or a DOHC type engine in synchronism with a crank shaft. The drive device of FIG. 1 comprises a drive pulley 2 rotatably driven by an engine crank shaft, a driven pully 3 secured on the end of the cam shaft, guide pulleys or driven pulleys 4 for guiding the belt 1 or driving a piece of auxiliary equipment such as a water pump, and a pulley 5 for applying proper tension to the belt 1.

The pulley 5 is pivotably supported on a rocker member 7 which swings around a pivot shaft 6. Secured to the rocker member 7 is a bracket 8, and a spring 9 is provided on the end of the bracket 8. Specifically, in order that uniform tension is normally maintained in the belt 1 regardless of changes in the dimensions of the belt 1 as a result of temperature changes and the like, or regardless of vibrations from the operation of the engine, an elastic pressure is applied by the pulley 5 against the belt 1 by the spring 9.

This type of autotensioner must not only provide the function of providing tension on the belt 1, but also the function of controlling the belt 1. Specifically, in the drive device of the cam shaft shown in FIG. 1, the part of the belt 1 positioned between the pulleys 2 to 5 has a tendency to vibrate in the direction at right angles to the running direction during the rotation of the drive pulley 2. In the case where this vibration is allowed to continue unchecked, the amplitude of vibration becomes large (the vibration is propagated), so that there is the problem that an extremely large vibration is developed in the drive section by the belt 1, which in the case of a toothed belt, may result in disengagement of the teeth results.

SUMMARY OF THE INVENTION

An object of the present invention is to provide, with due consideration to the drawbacks of such conventional devices, an autotensioner with such drawbacks are removed.

An autotensioner comprises, a fixed member adapted to be secured in a nonrotatable manner with respect to the engine cylinder block; a rocker member of which the base end section is supported in a freely rotatable manner with respect to the fixed member; a pivot shaft provided on the tip section of the rocker member parallel to center shaft on the rocker bearing section; a pulley supported in a freely rotatable manner on the periphery of the pivot shaft; a spring for providing a resilient force on the rocker member in the direction in which the pulley presses against the belt; and a damper device provided between the rocker member and the fixed member to provide a resistance to the rocker member which swings against the resilient force of the spring.

BRIEF DESCRIPTION OF ACCOMPANYING DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

Other features of this invention will become apparent in the course of the following description of exemplary embodiments which are given for illustration of the invention and are not intended to be limiting thereof.

Figure 2:
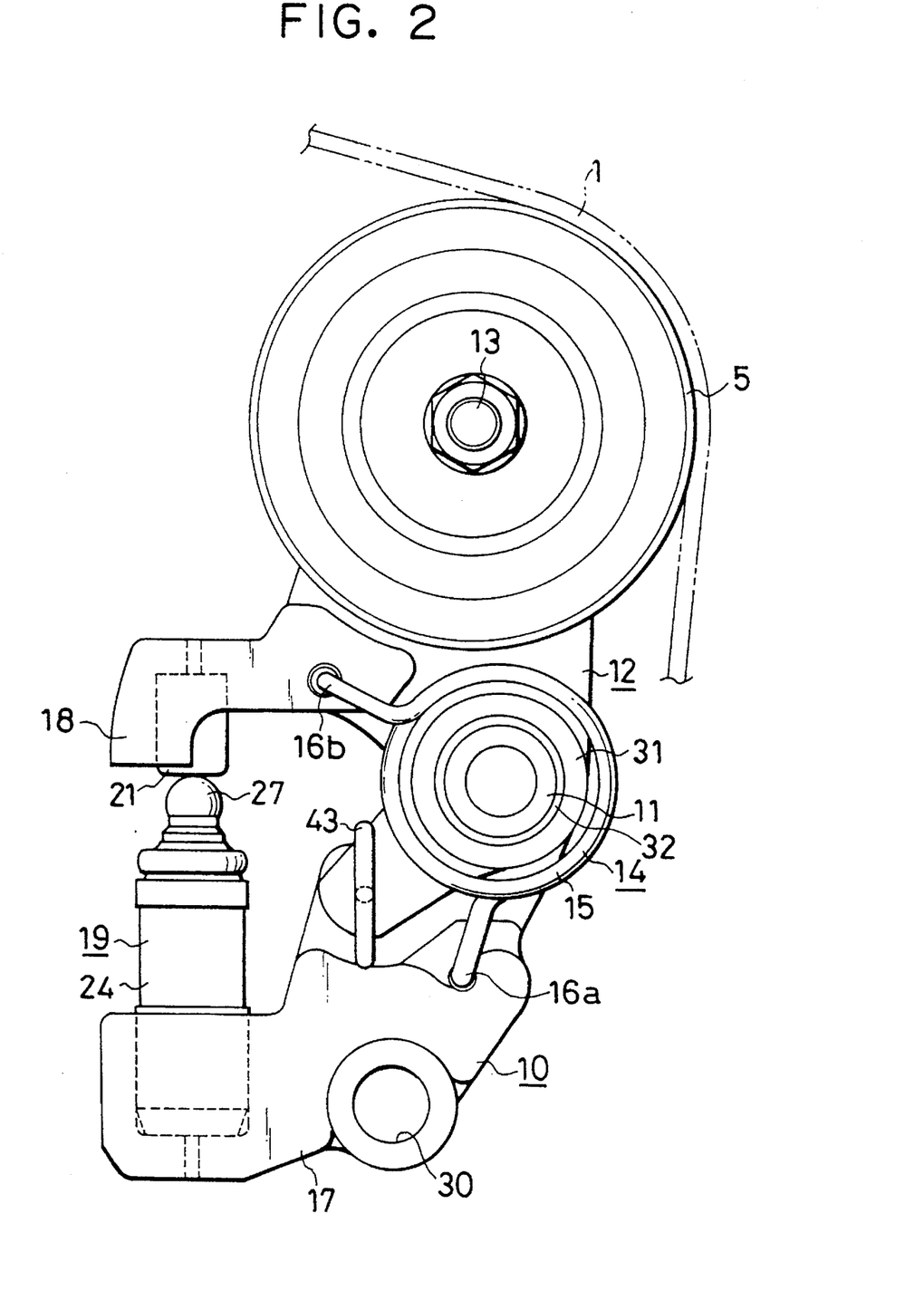
FIG. 2 is a front elevational view of a first embodiment of the autotensioner according to the present invention.

With due consideration to eliminating the drawbacks as mentioned above an autotensioner with the structure shown in FIG. 2 has been proposed in the present invention. The autotensioner shown in FIG. 2 comprises a fixed member such as a bracket 10 formed with a tubular fixed shaft or first axle 11, and a rocker member provided on the periphery of the tubular fixed shaft or first axle 11. A cylindrical section 31 formed on a base end section of the rocker member 12 is supported in a freely rotatable manner through a sliding bearing 32. On the tip portion of the rocker member 12, a pivot shaft or second axle 13 is provided parallel to the fixed shaft 11. A pulley 5 is supported in a freely rotatable manner at the periphery of the pivot shaft or second axle 13. A belt 1 for providing tension is installed on the pulley 5. In addition, a coil section 15 of a torsion coil or biasing spring 14 is positioned at the periphery of the fixed shaft 11. A pair of engaging sections 16a, 16b is provided, one on each end of the coil or biasing spring 14, and these engaging sections 16a, 16b are engaged with the fixed member 10 and the rocker member 12 respectively to provide an elastic force on the rocker member 12 by pressing the pulley 5 against the belt 1. The fixed shaft 11 is provided beyond the outer peripheral surface of the pulley 5 in the diametrical direction. Accordingly, the amount of displacement of the pulley 5 is quite large with respect to the swinging angle of the rocker member 12.

A damper device 19 is installed between a fixed side arm or projection 17 provided on the fixed member 10 and a rocker side arm 18 provided on the rocker member 12. Specifically, in the case of the configuration shown in the drawing, the base end section of a cylinder 24 is secured to the tip portion of the fixed side arm or projection 17, so that the tip portion of a plunger 27 is abutted against the bottom surface of a receiving block 21 secured to the tip portion of the rocker side arm 18.

Figure 3:
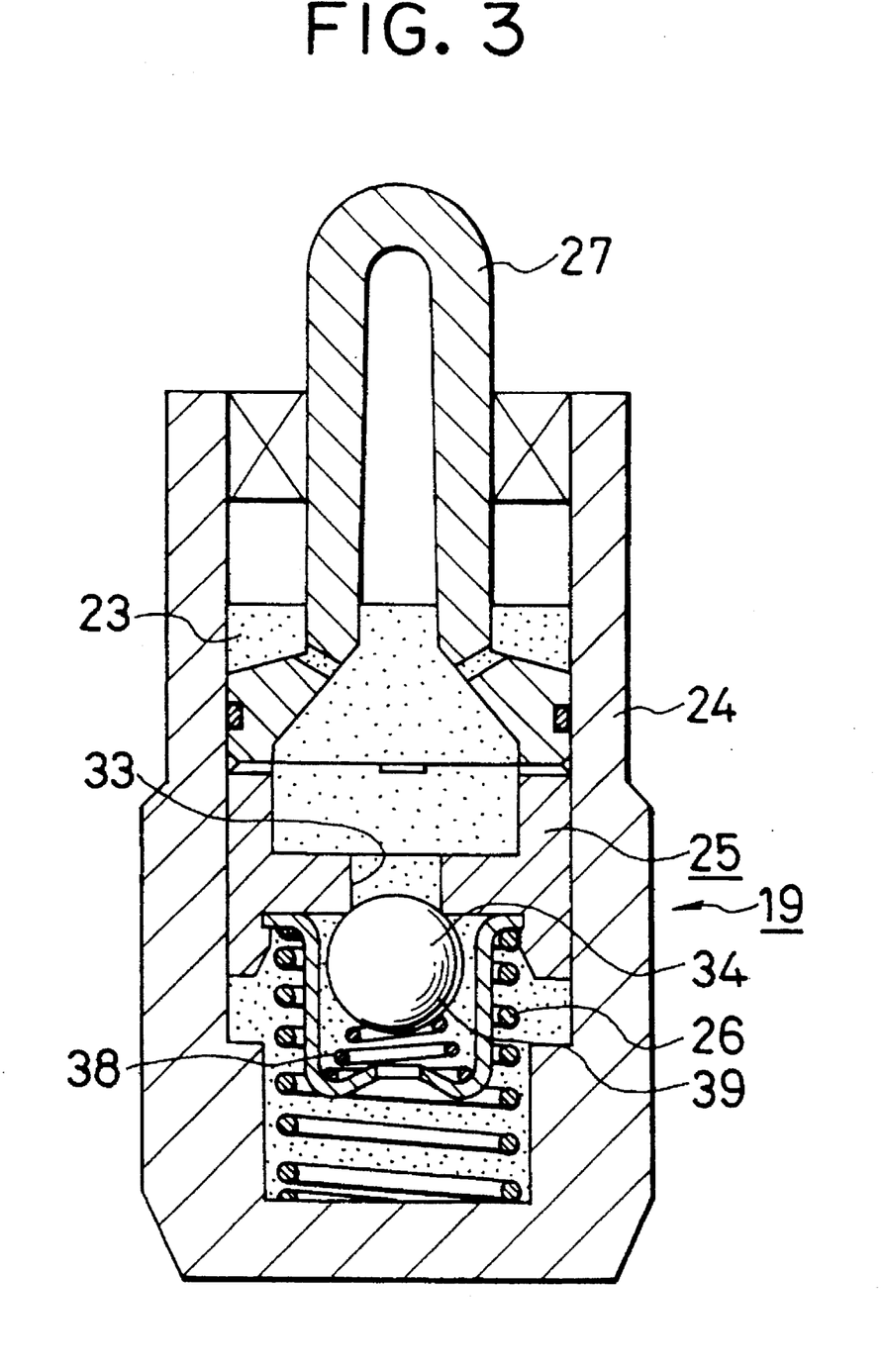
FIG. 3 is a vertical cross sectional view of a first embodiment of a damping device incorporated in the autotensioner of FIG. 2.

The damper device 19 is constructed, for example, as shown in FIG. 3. A piston 25 is inserted in a freely rising and falling manner in the bottom half of the inside of the cylinder 24 filled with a viscous fluid 23 such as silicon oil or the like, and the upper end surface of the piston 25 is abutted against the lower end surface of the plunger 27. Then, a resilient force is provided in the upward direction to the piston 25 and the plunder 27 by a spring 26 provided between the bottom surface of the cylinder 24 and the lower surface of the piston 25.

A check valve 39 comprising a ball 34 and a spring 38 is provided on the lower side of a through-hole 33 provided in the center section of the piston 25. The viscous fluid 23 flows freely through the through-hole 33 from the top to the bottom only. Accordingly, the plunger 27 is instantly displaced in the upward direction, and causes the damper device 19 to extend its entire length very rapidly, while the displacement in the downward direction is carried out slowly, so that the damper device 19 slowly extends to its full length.

Figure 4:
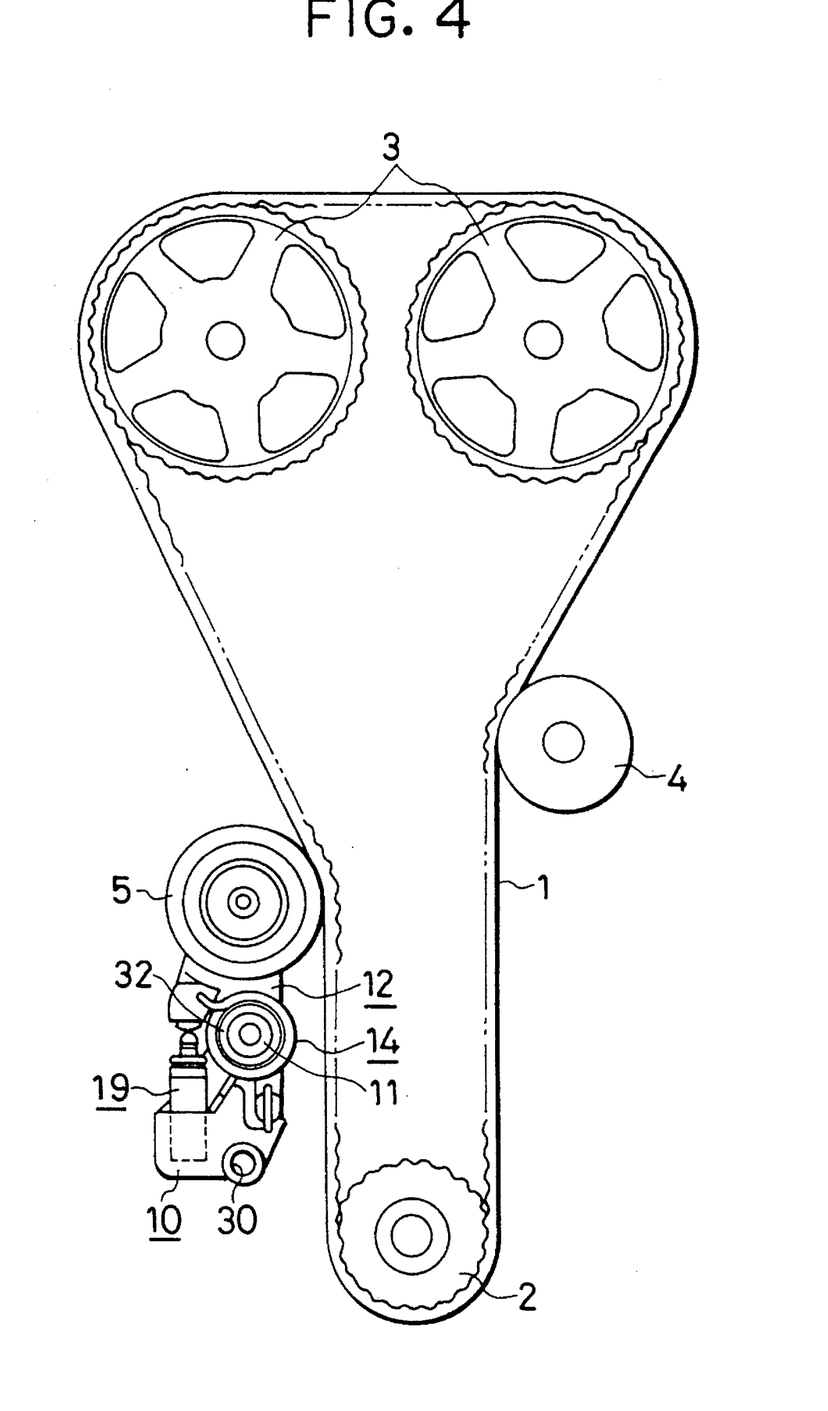
FIG. 4 is a front elevational view showing the operational state of the autotensioner of FIG. 2.

This autotensioner with the above-described construction incorporating the damper device constructed in the above manner, applies proper tension to the belt 1 for driving a cam shaft when installed in an engine in the manner illustrated in FIG. 4. Specifically, the autotensioner is installed in the engine using two bolts (omitted from the drawing) which are respectively inserted through a round hole 30 and through the interior of the tubular fixed shaft 11 provided in the fixed member 10, such that each of the bolts is securely screwed into a threaded hole formed in the front surface (not shown) of the cylinder block of the engine.

During the assembling operation, in the state that the rocker member 12 is swung a little against the resilient force of the torsion coil spring 14 with respect to the fixed member 10, a stopper pin or binding 43 (FIG. 2) is inserted into small holes formed in the fixed member 10 and the rocker member 12. The rocker member 12 is prevented by the stopper pin 43 from swinging more, so that the above-mentioned assembling operation is simplified. Then, the stopper pin 43 is removed from the small holes after the installation of the belt 1 on the pulley 5.

In the working state of the autotensioner installed in the engine in this manner, as shown in FIG. 4 (with the stopper pin 43 removed), the rocker member 12 swings as the result of the elasticity of the torsion coil spring 14, and the pulley 5 which is supported in a freely rotatable manner on the pivot shaft 13 at the tip portion of the rocker member 12, is pressed elastically against the belt 1. The swinging of the rocker member 12 is controlled by the pressure of the pulley 5 against the belt 1. In this state, the damper device 19 provided between the fixed side arm 17 and the rocker side arm 18 is in the extended or tension state because of the elastic force of the spring 26 (FIG. 3) between the fixed side arm 17 or a projecting section (not shown), and the rocker side arm 18.

When the belt 1 is slackened from this state, the rocker member 12 swings as a result of the elastic force of the torsion coil spring 14, and the pulley 5 follows the movement of the belt 1. At the same time, the damper device 19 is extended because of the elasticity of the spring 26. In this manner, when the damper device 19 is extended because of the elasticity of the spring 26, the check valve 39 opens. Specifically, the ball 34 descends, opposing the elastic force of the spring 38, and the lower end of the through-hole 33 is opened. As a result, the viscous fluid 23 moves smoothly from the upper side of the piston 25 to the lower side, and the piston 25 and the plunger 27 rise relatively instantly.

Conversely, when the tension of the belt 1 increases, the rocker member 12 has a tendency to rotate in opposition to the elastic force of the torsion coil spring 14. In this state, the rocker side arm 18 presses the damper device 19 in the compressing direction. Accordingly, in this case, in order that the rocker member 12 is caused to rotate, the plunger 27 and the piston 25 must be pressed into the cylinder 24 against the elastic force of the spring 24. At this time, the check valve 39 remains closed. Accordingly, as the piston 25 is descend in the cylinder 24, the viscous fluid 23 on the lower side of the piston 25 is caused to move to the upper side of the piston 25, which means that it must pass through an extremely small clearance between the inner peripheral surface of the cylinder 24 and the outer peripheral surface of the piston 25. Because the amount of the viscous fluid 23 which flows through the extremely small clearance is restricted, the displacement of the piston 23 and the plunger 27 is carried out slowly. As a result, the pulley 5, supported by the rocker member 12 is also displaced slowly from the action of the damper device 19, and the belt 1 is restrained by the pulley 5, so that the vibration of the belt 1 is not propagated.

However, in the autotensioner explained above, there are still the following problems (1) and (2) which must be resolved.

(1) It is not always possible due to the condition or construction of the engine to set the fixed member 10 at an optimum position, so that the efficiency of providing tension to the belt 1 is poor.

For example, the fixed member 10 is secured by two belts to the cylinder block on the inside of which a water jacket is provided. Therefore it is not possible to form the threaded holes for securing the bolts without adversely affecting the water jacket.

In addition, various types of parts are provided on the front surface of the cylinder block along the running section of the belt 1, therefore, the positions at which the above-mentioned threaded holes can be formed are restricted to prevent interference with these parts. In particular, in the case where the bolt which protrudes through to the inside of the tubular fixed shaft 11 is displaced from the optimum position because the threaded holes are displaced from the optimum position, this offset is linked to the offset in the relative positions of the pulley 5 and the belt 1.

For this reason, the direction in which the pulley 5 of the autotensioner presses the belt 1 is not necessarily the optimum direction in some the structures of the engine.

Figure 5A:
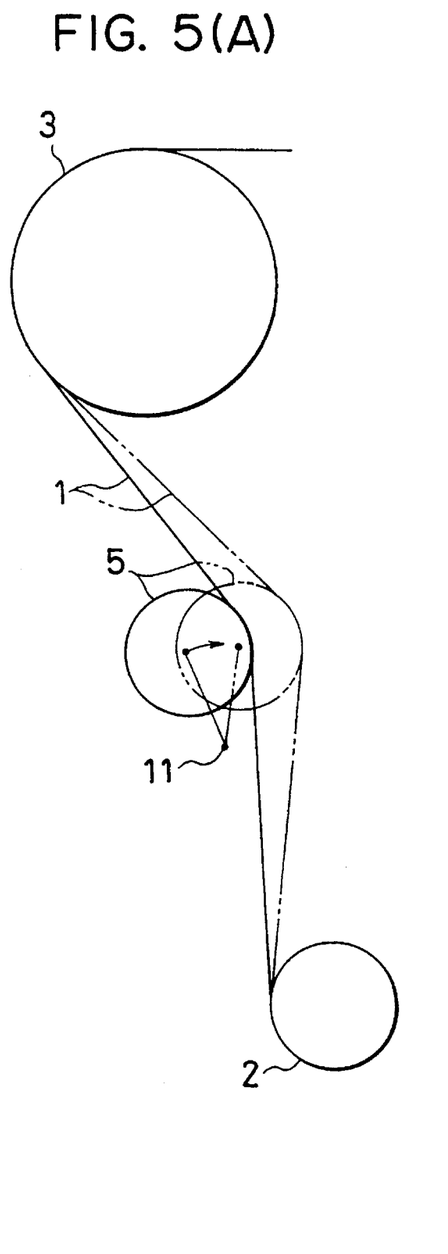
FIG. 5(A) is an abbreviated front elevational view showing the relationship between a pulley and a belt in the case where the rocker bearing section is provided in a normal position.

For example, as shown in FIG. 5(A), if the pulley 5 presses the belt 1 at an angle close to right angles with respect to the running direction, the pulley 5 quickly follows the tension change of the belt 1. Specifically, the pulley 5 is made to follow the movement of the belt 1 without making the swinging angle of the rocker member 12 larger, so that the efficiency of maintaining the tension of the belt 1 is good.

Figure 5B:
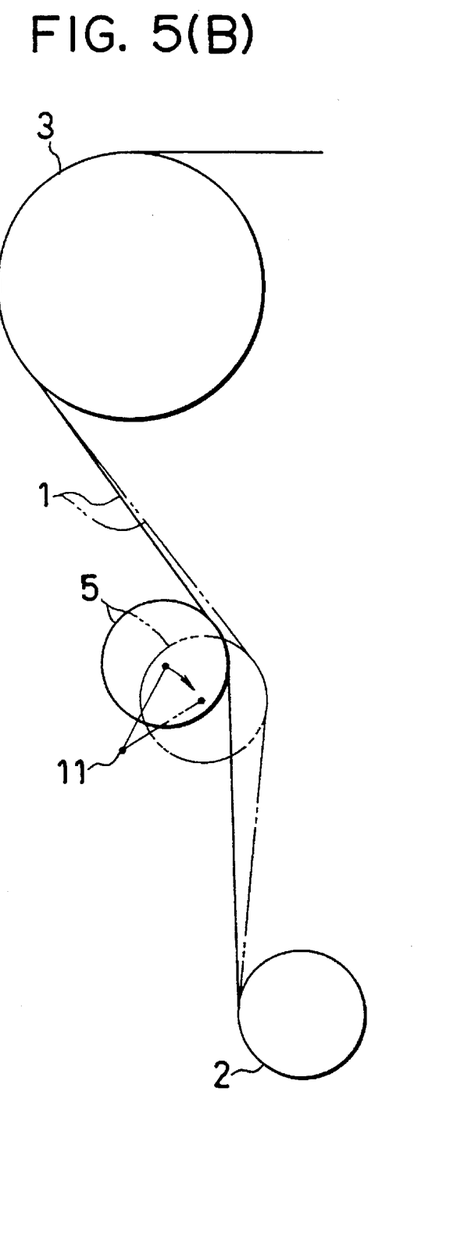
FIG. 5(B) is an abbreviated front elevational view showing the relationship between a pulley and a belt in the case where the rocker bearing section is provided in an abnormal position.

On the other hand, as shown in FIG. 5(B), when the pulley 5 presses the belt 1 at an angle close to the running direction of the belt 1, the pulley 5 delays in following the tension change of the belt 1. Specifically, in such a case, when the swinging angle of the rocker member 12 must be larger in order that the pulley 5 can be made to follow the movement of the belt 1. Consequently, the efficiency of maintaining the tension of the belt 1 is not good.

(2) As the tension of the belt 1 changes, the coil section 15 of the torsion coil spring 14 rubs against the cylindrical section 31 of the rocker member 12 causing wear on the outer peripheral surface of the cylindrical section 31. Specifically, when the tension on the belt 1 changes and the pulley 5 is displaced, the rocker member 12 swings at an angle corresponding to the amount of displacement. As opposed to this, the amount of displacement of the coil section 15 is extremely small, to the extent that there is almost no rotation. Accordingly, the coil section 15 and the cylindrical section 31 rotate relative to each other corresponding to the change in tension of the belt 1.

In addition, the coil section 15 is radially displaced corresponding to the deformation of the coil spring 14 as the rocker member 12 swings.

As a result, as the tension changes, the inner peripheral edge of the coil section 15 rubs against the outer peripheral surface of the cylindrical section 31. Although the coil spring 14 is made from a hard material such as spring steel, the rocker member 12 which includes the cylindrical section 31 is often made from an aluminum alloy in order to lighten it. For this reason, the outer peripheral surface of the cylindrical section 31 gradually wears, and a groove is formed there conforming to the inner peripheral edge of the coil section 15. As a result, not only is there high resistance to the swinging of the rocker member 12, but powder resulting from abrasion entering the rotation support sections is believed to have an adverse effect on the durability of the rotation support sections.

The problems as mentioned above is overcome by the provision of an autotensioner in the following embodiments comprising, a fixed member adapted to be secured in a nonrotatable manner with respect to the engine cylinder block; a rocker member of which the base end section is supported in a freely rotatable manner with respect to the fixed member by means of a rocker bearing section provided between the fixed member and the rocker member; a pivot shaft provided on the tip section of the rocker member parallel to a center shaft on the rocker bearing section; a pulley supported in a freely rotatable manner on the periphery of the pivot shaft; a spring for providing a resilient force on the rocker member in the direction in which the pulley presses against the belt; and a damper device provided between the rocker member and the fixed member to provide a resistance to the rocker member which swings against the resilient force of the spring.

The rocker bearing section comprises a cylindrical section provided in one part of the fixed member; a displacement shaft inserted into the cylindrical section with its base end section secured to the rocker member; and a sliding bearing provided between the outer peripheral surface of the displacement shaft and the inner peripheral surface of the cylindrical section.

In this construction, bolts for securing the fixed member to the cylinder block do not have to be inserted through the rocker bearing section. Therefore, the direction in which the pulley presses against the belt can be the optimum direction or close to the optimum direction even when it is not possible to form threaded holes at one part of the cylinder block corresponding to the rocker bearing section. In addition, the spring does not rub against the rocker member so that there is no wear in the structural parts of the rocker member and the like as the tension in the belt changes.

The present embodiments will now be explained with reference to the drawings.

The parts which are identical to or correspond to parts in the first embodiment of the autotensioner have been assigned the same reference numerals as the first embodiment of the autotensioner, and further explanation for example, about the relationship between the damper device 19, the rocking member 12 and the fixed member 11 is omitted. The following explanation covers the special parts of the present embodiments.

Figure 6:
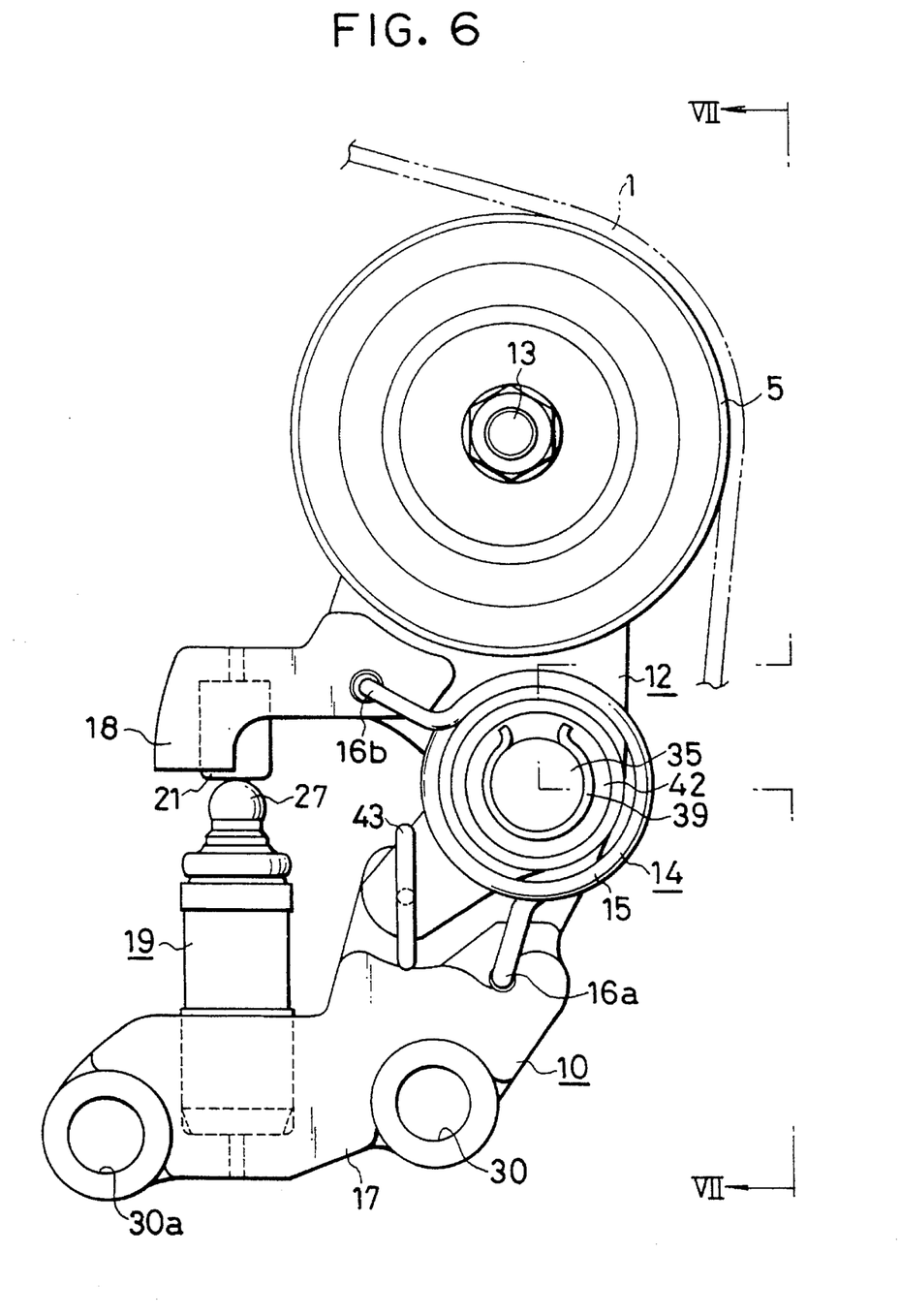
FIG. 6 is a front elevational view of a second embodiment of the present invention.
Figure 7:
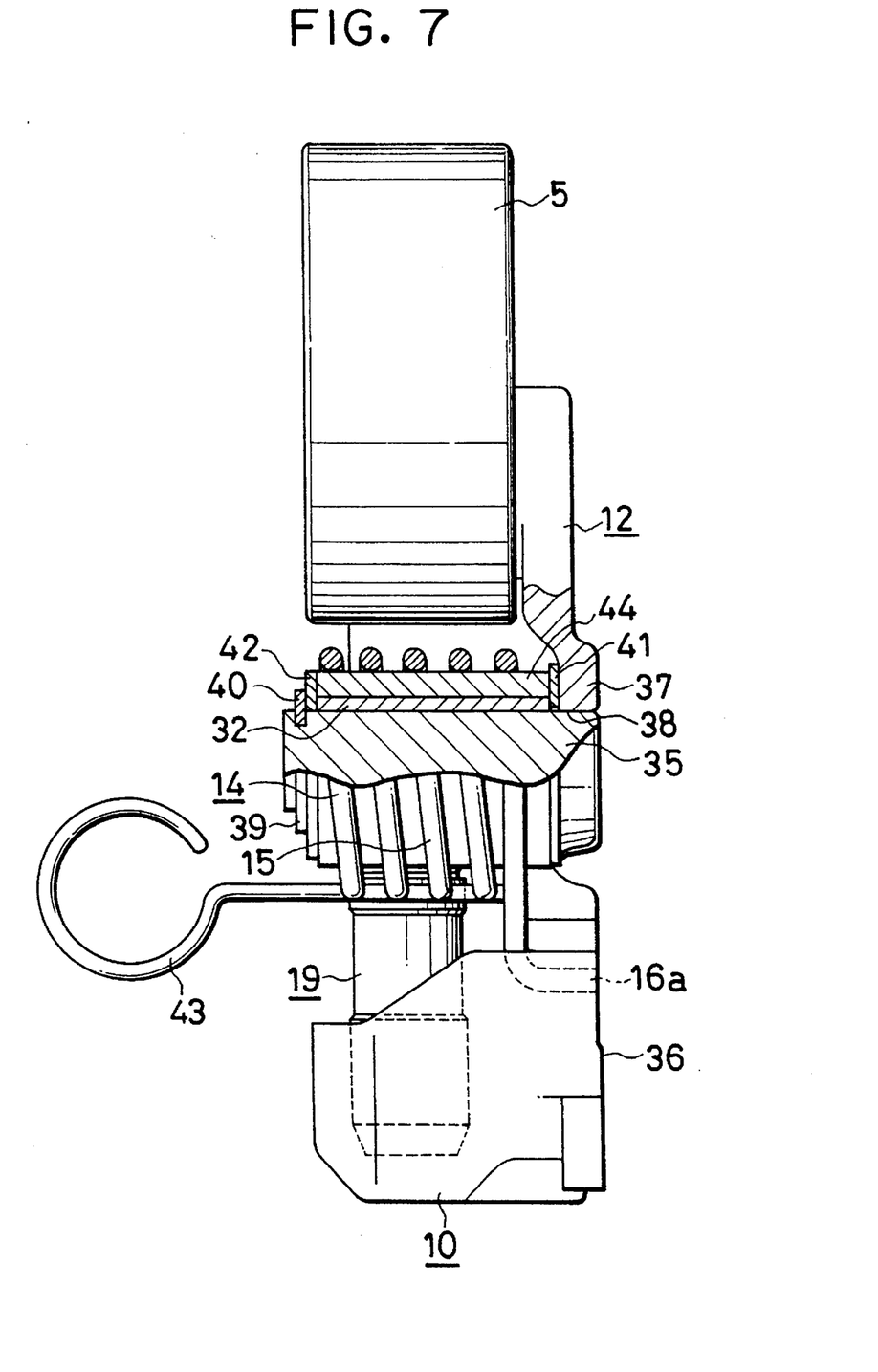
FIG. 7 is a partly cut-away, cross sectional view taken along the line VII—VII in FIG. 6.
Figure 8:
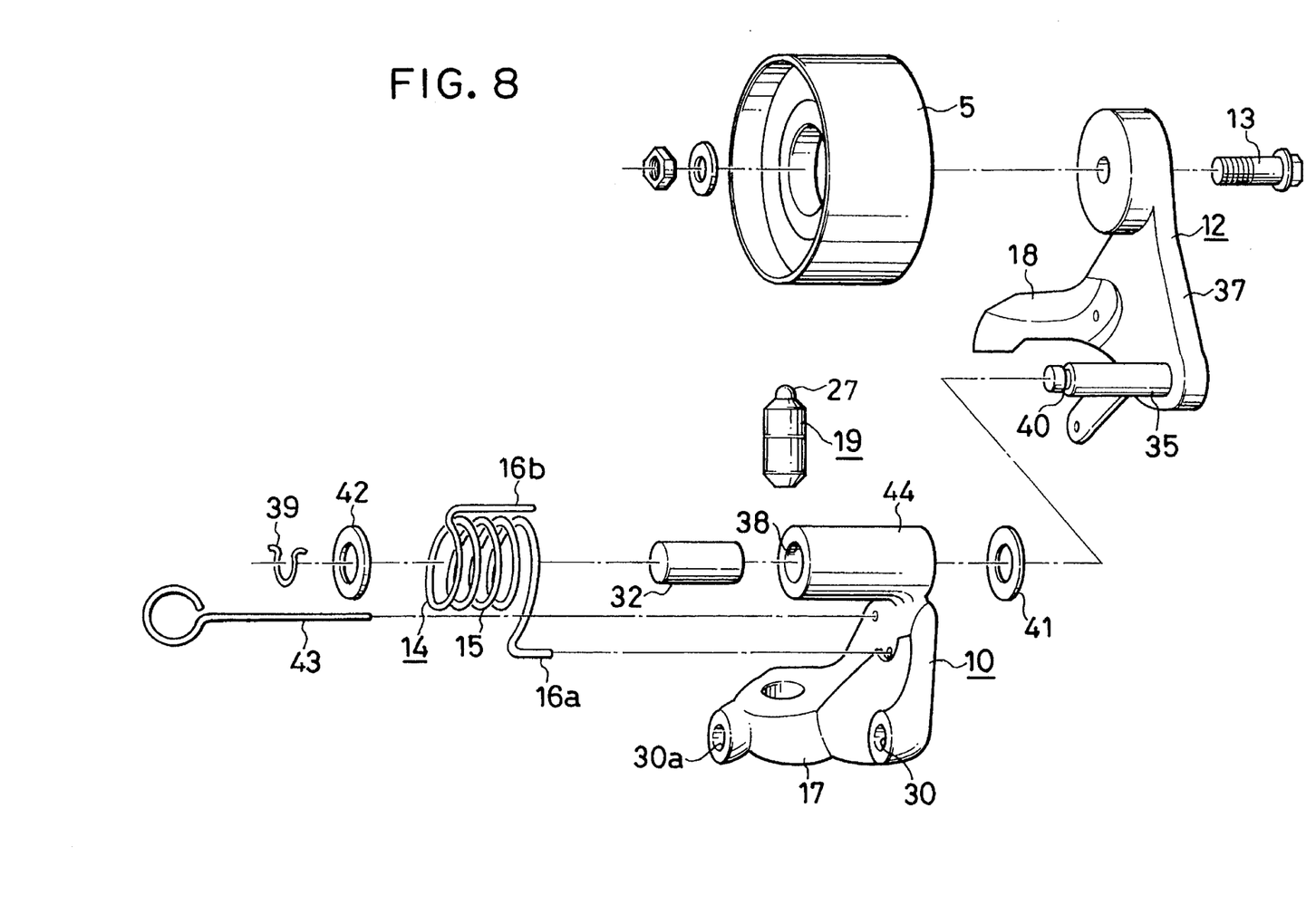
FIG. 8 is an exploded perspective view of the second embodiment of the present invention.

FIGS. 6 to 8 show a second embodiment of the present invention. A special feature of the embodiment of the autotensioner is that the structure of a rocker pivot section for pivotally supporting a rocker member 12 on a fixed member or bracket 10 is tailored, so that the direction in which the pulley 5 presses the belt 1 is controlled in the optimum direction, and the coil section 15 of the torsion coil or biasing spring 14 is prevented from rubbing against the mating member.

A pair of round holes 30, 30a is formed at two mutually separated locations on the lower side section of the fixed member or bracket 10. The fixed member or bracket 10 is secured in a non-rotatable manner to the front surface of the engine cylinder block (not shown) by means of bolts (not shown) inserted through the round holes 30, 30a.

The rocker bearing section for pivotally supporting a base end section 37 of the rocker member 12 on the fixed member or bracket 10 secured to the front surface of the cylinder block in this manner comprises a cylindrical section 44 provided on the upper end section of the fixed member 10; a displacement shaft or first axle 35 of which the base end section 37 is secured to the rocker member 12; and a sliding bearing 32 provided between the outer peripheral surface of the displacement shaft or axle 35 and the inner peripheral surface of the cylindrical section 44 of the fixed member or bracket 10.

Each part will now be explained in detail. First, one end of the cylindrical section 44 (the right end in FIG. 7) is open at a position axially displaced or offset from a mounting surface 36 for the fixed member 10. Accordingly, when the fixed member 10 is secured to the front surface (not shown) of the cylinder block, a gap is formed between the open end section of the cylindrical section 44 and the front surface of the cylinder block. The base end section 37 of the rocker member 12 is inserted into this gap.

Next, the base end section of the displacement shaft or first axle 35 (the right end section in FIG. 7) is firmly secured by shrink fitting to the inside of a round hole 38 formed in the base section 37. The dimension of the outer diameter of the displacement shaft 35 is slightly smaller than the dimension of the inner diameter of the cylindrical section 44.

In addition, an engaging groove 40 is formed on the tip section of the displacement shaft 35 for receiving a stopper ring 39.

The sliding bearing 32 is formed in a cylindrical shape from a material such as nylon, polytetrafluoride ethylene, or the like with good sliding property, and has an inner diameter dimension which is the same or slightly larger than the outer diameter dimension of the displacement shaft 35, and an outer diameter dimension which is the same or slightly smaller than the inner diameter dimension of the cylindrical section 44.

When forming the rocker bearing section, the displacement shaft 35 of the type outlined above is inserted into the inside of the cylindrical section 44 from the open end of the cylindrical section 44. At this time, the sliding bearing 32 is inserted between the outer peripheral surface of the displacement shaft 35 and the inner peripheral surface of the cylindrical section 44. A thrust washer 41 fabricated from an easily-sliding material is interposed between one end of the cylindrical section 44 and the base end section 37 of the rocker member 12a. Another thrust washer 42 is fitted around the tip section of the displacement shaft 35 which projects from the other end opening of the cylindrical section 44 (the left end in FIG. 7), and the stopper ring 39 is held in the engaging groove 40 provided in the tip section of the displacement shaft 35 outside the thrust washer 42. As a result, the rocker bearing section is formed, so that the rocker member 12 is supported in a freely swinging manner with respect to the fixed member 10.

In the autotensioner with this structure in this embodiment, it is not necessary for the bolt for securing the fixed member 10 to the front surface of the cylinder block to penetrate the rocker bearing section. This bolt only penetrates the two round holes 30, 30a formed on the lower side section of the fixed member 10. Therefore, even in the case where the formation of a threaded hole is impossible in the section of the cylinder block corresponding to the rocker bearing section, the direction at which the pulley 5 presses against the belt 1 can be the optimum direction or close to the optimum direction. Also, the position at which the two round holes 30, 30a are formed, is freely changeable to an optional position corresponding to the position of the water jacket provided in the cylinder block and the like.

Also, the coil section 15 of the torsion coil spring 14 for applying tension is positioned at the periphery of the cylindrical section 44 provided in the fixed member 10. Even in the case when the rocker member 12 swings from a change in tension of the belt 1, the cylindrical section 44 does not rotate. For this reason, there is almost no rubbing between the inner peripheral edge of the coil section 15 and the outer peripheral surface of the cylindrical section 44. Accordingly, there is almost no wear on the outer peripheral surface of the cylindrical system 44 opposed to the inner peripheral edge of the coil section 15.

Figure 9:
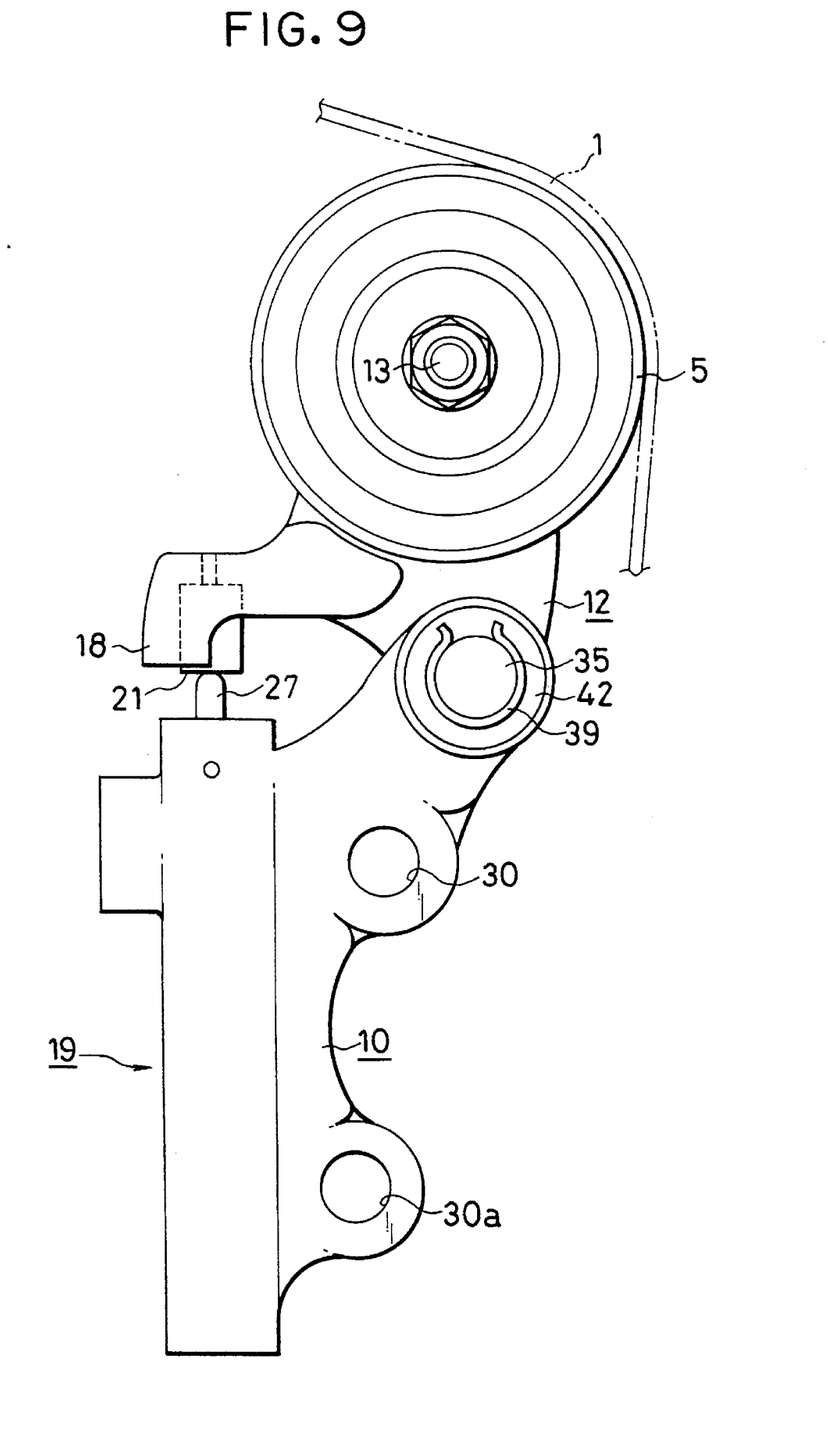
FIG. 9 is a front elevational view of a third embodiment of the present invention.
Figure 10:
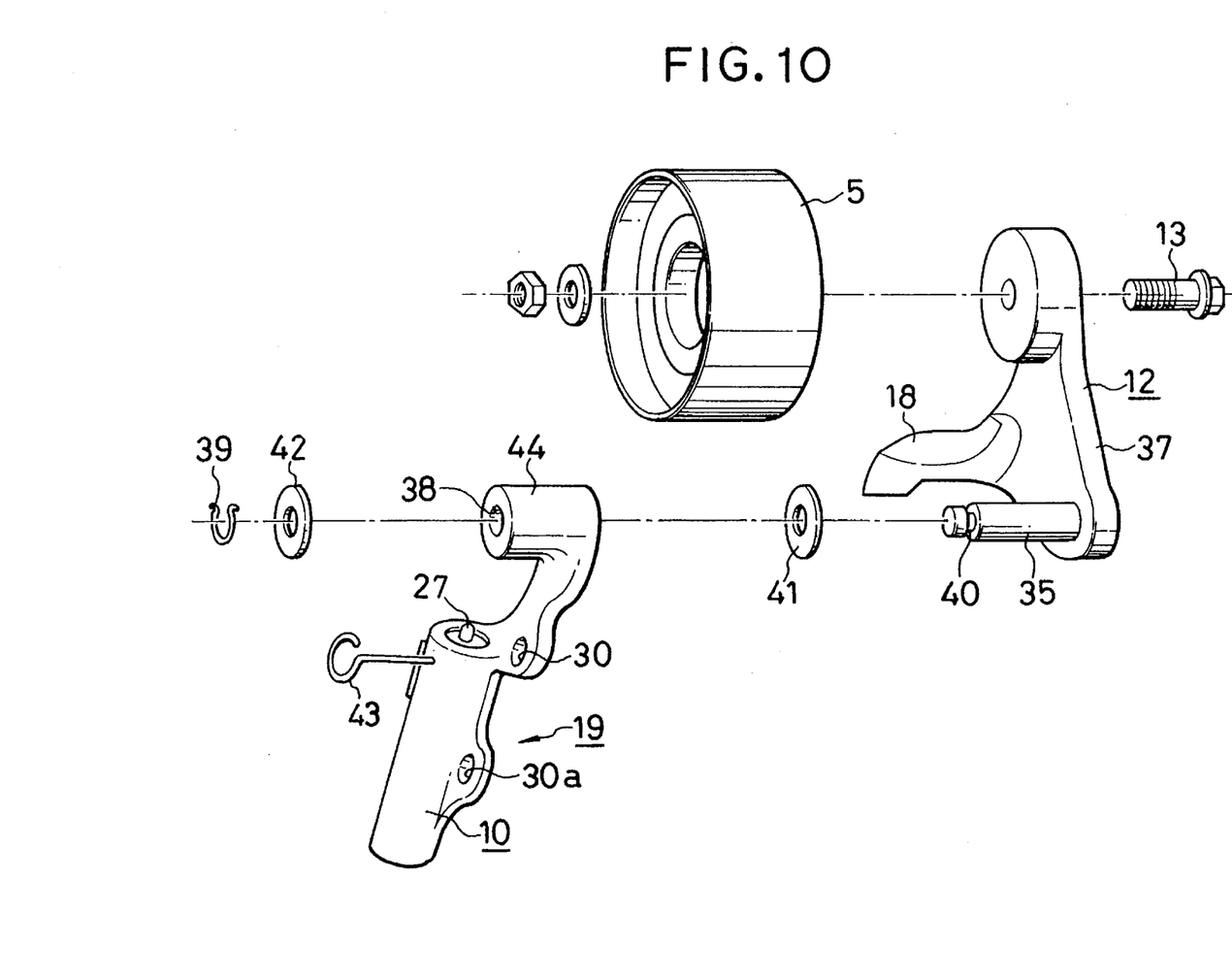
FIG. 10 is an exploded perspective view of the third embodiment of the present invention.

FIGS. 9 and 10 are views of a third embodiment of the present invention. In the case of this embodiment, by providing high tension in a spring built into a damper device 19 installed in a fixed member 10, the projection force of the plunger 27 of the damper device 19 is increased. The rocker member 12 is then pressed by the plunger 27, and the pulley 5 is freely pressed against the belt 1. Further, after the installation of the autotensioner on the front surface of the cylinder block, the stopper pin 43 is removed so that the amount of projection of the plunger 27 from a cylinder 24 is increased.

In this embodiment, not only is it possible to set the rocker bearing section in a specified position, but the rocker bearing section is installed in the damper device 19, so that the spring for applying tension can be completely prevented from rubbing against the rocker member 12. The other parts of the structure and the operation are substantially the same as for the second embodiment.

Although the embodiments above are directed to the cases where the fixed member or bracket with a projection, i.e. arm for supporting the damper device is disposed between the damper device and the engine body, i.e. cylinder block, the damper device can be directly supported by the engine body.

Specifically, a projection for supporting the damper device can be integrally formed on the engine cylinder block.

In addition, the torsion coil or biasing spring has one end connected to the fixed member or bracket in the embodiments mentioned above. However, this end of the biasing spring can be directly connected to the engine body or engine cylinder block.

Further, the biasing spring can be contained in the damper cylinder as shown in FIG. 9.

It should be noted that all these modifications should be covered by the present invention.

Because the autotensioner of the present invention is constructed and operated as described above, it not only demonstrates maximum efficiency according to the design values, but also wear is prevented in the structural parts, so that the reliability and durability of the autotensioner and the peripheral equipment is improved.

What is claimed is:

1. An autotensioner for use in applying a tension to a moving belt, comprising:

a bracket secured to an engine body and having a projection and a bearing, a rocking member having an arm and a first axle and rockingly mounted to the bracket through the first axle, so that the first axle is supported by the bearing, a pulley rotatably mounted to the rocking member through a second axle for applying the tension to the moving belt, and a damper device provided between the projection of the bracket and the arm of the rocking member.

2. An autotensioner for use in applying a tension to a moving belt, comprising:

a bracket secured to an engine body and having a projection, a rocking member rockingly mounted to the bracket through a first axle and having an arm, a pulley rotatably mounted to the rocking member through a second axle for applying the tension to the moving belt, a damper device provided between the projection of the bracket and the arm of the rocking member, and a biasing spring placed between the rocking member and the bracket and adapted to apply an elastic force to the pulley so as to press the belt.

* * * * *